(12) United States Patent
Xu et al.

(10) Patent No.: US 12,079,231 B2
(45) Date of Patent: *Sep. 3, 2024

(54) INTELLIGENT ANALYTICS FOR CLOUD COMPUTING APPLICATIONS

(71) Applicant: SAP SE, Walldorf (DE)

(72) Inventors: Hong Xu, Charlotte, NC (US); Roberto Valdovinos, Santiago (CL); Jason Kirst, San Francisco, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,006

(22) Filed: Oct. 12, 2023

(65) Prior Publication Data

US 2024/0037111 A1     Feb. 1, 2024

Related U.S. Application Data

(63) Continuation of application No. 17/336,242, filed on Jun. 1, 2021, now Pat. No. 11,816,113.

(51) Int. Cl.
| | | |
|---|---|---|
| *G06F 16/00* | (2019.01) | |
| *G06F 16/23* | (2019.01) | |
| *G06F 16/2457* | (2019.01) | |
| *G06F 16/25* | (2019.01) | |
| *G06Q 30/0203* | (2023.01) | |

(52) U.S. Cl.
CPC .... *G06F 16/24578* (2019.01); *G06F 16/2379* (2019.01); *G06F 16/252* (2019.01); *G06Q 30/0203* (2013.01)

(58) Field of Classification Search
CPC .......... G06F 16/24578; G06F 16/2379; G06F 16/252

See application file for complete search history.

(56) References Cited

U.S. PATENT DOCUMENTS

| | | | |
|---|---|---|---|
| 11,315,179 B1 * | 4/2022 | Rehder | G06F 18/2113 |
| 2008/0077473 A1 * | 3/2008 | Allin-Bradshaw | G06Q 30/0641 345/418 |
| 2008/0320343 A1 * | 12/2008 | Eickmeyer | G06F 11/3676 714/57 |
| 2009/0313055 A1 * | 12/2009 | Martin | G06Q 10/02 705/5 |
| 2010/0229112 A1 * | 9/2010 | Ergan | G06F 11/0769 715/764 |

(Continued)

*Primary Examiner* — Noosha Arjomandi
(74) *Attorney, Agent, or Firm* — Fountainhead Law Group, PC

(57) ABSTRACT

Some embodiments provide a non-transitory machine-readable medium that stores a program. The program receives, from a client device, a request for information associated with a category. In response to the request, the program further accesses a storage to retrieve a first value associated with the category. The program also determines a set of values associated with the category based on a plurality of transactions. The program further determines an optimization level value associated with the category. The program also determines a second value associated with the category based on the first value, the set of values, and the optimization level value. The program further provides, by an application operating on the device, a graphical user interface (GUI) to the client device, the GUI comprising the second value.

20 Claims, 8 Drawing Sheets

(56) References Cited

U.S. PATENT DOCUMENTS

| | | | |
|---|---|---|---|
| 2012/0203708 A1* | 8/2012 | Psota | G06Q 30/02 |
| | | | 705/347 |
| 2013/0218637 A1* | 8/2013 | Bikman | G06Q 30/0201 |
| | | | 705/7.29 |
| 2015/0073929 A1* | 3/2015 | Psota | G06Q 30/0201 |
| | | | 705/26.2 |
| 2018/0129989 A1* | 5/2018 | Bowers | G06Q 10/0635 |
| 2020/0012542 A1* | 1/2020 | Shapiro | G06F 9/542 |
| 2020/0097882 A1* | 3/2020 | Alagappan | G06Q 50/16 |
| 2020/0265365 A1* | 8/2020 | Kim | G06Q 10/10 |
| 2020/0342352 A1* | 10/2020 | Neumann | G06N 20/00 |
| 2020/0357048 A1* | 11/2020 | Taylor | G06F 15/0225 |
| 2020/0409510 A1* | 12/2020 | Schilling | G06F 3/0481 |
| 2021/0004377 A1* | 1/2021 | Neumann | G06Q 50/22 |
| 2021/0004691 A1* | 1/2021 | Neumann | G16H 50/70 |
| 2021/0026871 A1* | 1/2021 | Agrawal | G06F 11/302 |
| 2021/0133181 A1* | 5/2021 | Thummala Abbigari | |
| | | | G06F 16/2379 |
| 2021/0279809 A1* | 9/2021 | Penner | G06Q 40/08 |
| 2022/0044266 A1* | 2/2022 | Latka | G06F 16/2379 |
| 2022/0382764 A1* | 12/2022 | Xu | G06F 16/252 |

\* cited by examiner

Questionnaire

| 205 | Extremely Low | Somewhat Low | Neutral | Somewhat High | Extremely High | N/A |
|---|---|---|---|---|---|---|
| Question #1 | 210 ○ | 215 ○ | 220 ○ | 225 ○ | 230 ○ | 235 ○ |
| Question #2 | ○ | ○ | ○ | ○ | ○ | ○ |
| Question #3 | ○ | ○ | ○ | ○ | ○ | ○ |
| Question #4 | ○ | ○ | ○ | ○ | ○ | ○ |
| Question #5 | ○ | ○ | ○ | ○ | ○ | ○ |
| Question #6 | ○ | ○ | ○ | ○ | ○ | ○ |
| ⋮ | | | | | | |
| Question #N | ○ | ○ | ○ | ○ | ○ | ○ |

240 — Submit

FIG. 2

INTELLIGENT ANALYTICS FOR CLOUD COMPUTING APPLICATIONS

BACKGROUND

In data analytics, data and/or statistics are analyzed in order to derive meaningful insights into the data and/or statistics. For example, analytics can be used to predict future trends of data, events that may occur in the future, etc. Another use of analytics may be prescribing actions to perform in response to predictions. There are many fields in which analytics can be applied. For instance, software analytics involves analyzing source code, software metrics, processes related to the development of source code, etc., in order to describe, monitor, predict, and improve efficiency and effectivity of the software development process. In the field of security, analytics can be used analyze security events in order to determine which events pose risks to security. The application of analytics to people uses behavioral data to understand how people behave and function. Areas where people analytics can be used include workforce analytics, human resources analytics, talent analytics, human capital analytics, etc. In addition, analytics is applicable to finance fields. For example, analytics may be used to analyze and predict stock prices, determine how to manage risk and diversify investment portfolios, determine loan lending decisions, etc.

SUMMARY

In some embodiments, a non-transitory machine-readable medium stores a program executable by at least one processing unit of a device. The program receives, from a client device, a request for information associated with a category. In response to the request, the program further accesses a storage to retrieve a first value associated with the category. The program also determines a set of values associated with the category based on a plurality of transactions. The program further determines an optimization level value associated with the category. The program also determines a second value associated with the category based on the first value, the set of values, and the optimization level value. The program further provides, by an application operating on the device, a graphical user interface (GUI) to the client device, the GUI comprising the second value.

In some embodiments, determining the rate value associated with the category may include adjusting the average rate value based on the optimization level value. The request may be further for information associated with a plurality of categories. The program may further, in response to the request, access the storage to retrieve a first plurality of values associated with the plurality of categories; for each particular category in the plurality of categories, determine a particular set of values associated with the particular category based on a particular plurality of transactions; for each particular category in the plurality of categories, determine a particular optimization level value associated with the particular category; and, for each particular category in the plurality of categories, determine a particular value associated with the particular category based on a corresponding value in the first plurality of values, the particular set of values associated with the particular category, and the particular optimization level value associated with the particular category. The GUI may further include the particular values associated with the plurality of categories. The program may further determine a prioritized list of the plurality of categories based on a set of criteria.

In some embodiments, the program may further receive an aggressiveness value from a user of a client device. Determining the rate value associated with the category may include adjusting the average rate value based on the aggressiveness value. The program may further access a plurality of historical transactions and determine a rate value for each historical transaction in the plurality of historical transactions. Determining the average rate value may be further based on the rate value determined for each historical transaction in the plurality of historical transactions. Determining the standard deviation value associated with the category may be based on the rate value determined for each historical transaction in the plurality of historical transactions.

In some embodiments, a method executable by a device receives, from a client device, a request for information associated with a category. In response to the request, the method further accesses a storage to retrieve a first value associated with the category. The method also determines a set of values associated with the category based on a plurality of transactions. The method further determines an optimization level value associated with the category. The method also determines a second value associated with the category based on the first value, the set of values, and the optimization level value. The method further provides, by an application operating on the device, a graphical user interface (GUI) to the client device, the GUI comprising the second value.

In some embodiments, determining the rate value associated with the category may include adjusting the average rate value based on the optimization level value. The request may be further for information associated with a plurality of categories. In response to the request, the method may further access the storage to retrieve a first plurality of values associated with the plurality of categories; for each particular category in the plurality of categories, determine a particular set of values associated with the particular category based on a particular plurality of transactions; for each particular category in the plurality of categories, determine a particular optimization level value associated with the particular category; and, for each particular category in the plurality of categories, determine a particular value associated with the particular category based on a corresponding value in the first plurality of values, the particular set of values associated with the particular category, and the particular optimization level value associated with the particular category. The GUI may further include the particular values associated with the plurality of categories. The method may further determine a prioritized list of the plurality of categories based on a set of criteria.

In some embodiments, the method may further receive an aggressiveness value from a user of a client device. Determining the rate value associated with the category may include adjusting the average rate value based on the aggressiveness value. The method may further access a plurality of historical transactions and determine a rate value for each historical transaction in the plurality of historical transactions. Determining the average rate value may be further based on the rate value determined for each historical transaction in the plurality of historical transactions. Determining the standard deviation value associated with the category may be based on the rate value determined for each historical transaction in the plurality of historical transactions.

In some embodiments, a system includes a set of processing units and a non-transitory machine-readable medium that stores instructions. The instructions cause at least one processing unit to receive, from a client device, a request for information associated with a category. In response to the request, the instructions further cause the at least one processing unit to accessing a storage to retrieve a first value associated with the category. The instructions also cause the at least one processing unit to determine a set of values associated with the category based on a plurality of transactions. The instructions further cause the at least one processing unit to determine an optimization level value associated with the category. The instructions also cause the at least one processing unit to determine a second value associated with the category based on the first value, the set of values, and the optimization level value. The instructions further cause the at least one processing unit to provide, by an application operating on the system, a graphical user interface (GUI) to the client device, the GUI comprising the second value.

In some embodiments, determining the rate value associated with the category may include adjusting the average rate value based on the optimization level value. The request may be further for information associated with a plurality of categories. The instructions may further cause the at least one processing unit to, in response to the request, access the storage to retrieve a first plurality of values associated with the plurality of categories; for each particular category in the plurality of categories, determine a particular set of values associated with the particular category based on a particular plurality of transactions; and, for each particular category in the plurality of categories, determine a particular optimization level value associated with the particular category; for each particular category in the plurality of categories, determine a particular value associated with the particular category based on a corresponding value in the first plurality of values, the particular set of values associated with the particular category, and the particular optimization level value associated with the particular category. The GUI may further include the particular values associated with the plurality of categories. The instructions may further cause the at least one processing unit to determine a prioritized list of the plurality of categories based on a set of criteria.

In some embodiments, the instructions may further cause the at least one processing unit to receive an aggressiveness value from a user of a client device. Determining the rate value associated with the category may include adjusting the average rate value based on the aggressiveness value. The instructions may further cause the at least one processing unit to access a plurality of historical transactions and determine a rate value for each historical transaction in the plurality of historical transactions. Determining the average rate value may be further based on the rate value determined for each historical transaction in the plurality of historical transactions.

The following detailed description and accompanying drawings provide a better understanding of the nature and advantages of various embodiments of the present disclosure.

BRIEF DESCRIPTION OF THE DRAWINGS

FIG. 2 illustrates an example questionnaire according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for providing intelligent analytics for cloud computing applications. In some embodiments, a computing system is configured to intelligently determine different rate values for different categories of goods and/or services. To determine a rate value for a particular category of goods and/or services, the computing system uses a history of transactions (e.g., past transactions) associated with the category of goods and/or services. From this historical data, the computing system determines a savings rate for each transaction. In some embodiments, a savings rate of a transaction represents a ratio (e.g., a percentage) between (1) the difference between a price paid for the goods and/or services in the transaction and an average price paid for the goods and/or services in the past and (2) the price paid for the goods and/or services in the transaction. Based on the savings rates determined for the history of transactions, the computing system calculates an average savings rate value and a standard deviation value. Next, the computing system uses the average savings rate value, the standard deviation value, an optimization level value, and an aggressiveness value to determine a savings rate value for the category of goods and/or services. Based on the determined savings rate value and a forecast value that represents an estimated amount that will be spent for the category of goods and/or services in the future, the computing system may calculate a forecast of an amount saved on future expenditures for the category of goods and/or services. In addition, the computing system can calculate a confidence value and/or probability that represents the likelihood of achieving the forecasted amount saved on future expenditures for the category of goods and/or services.

Figure 1:
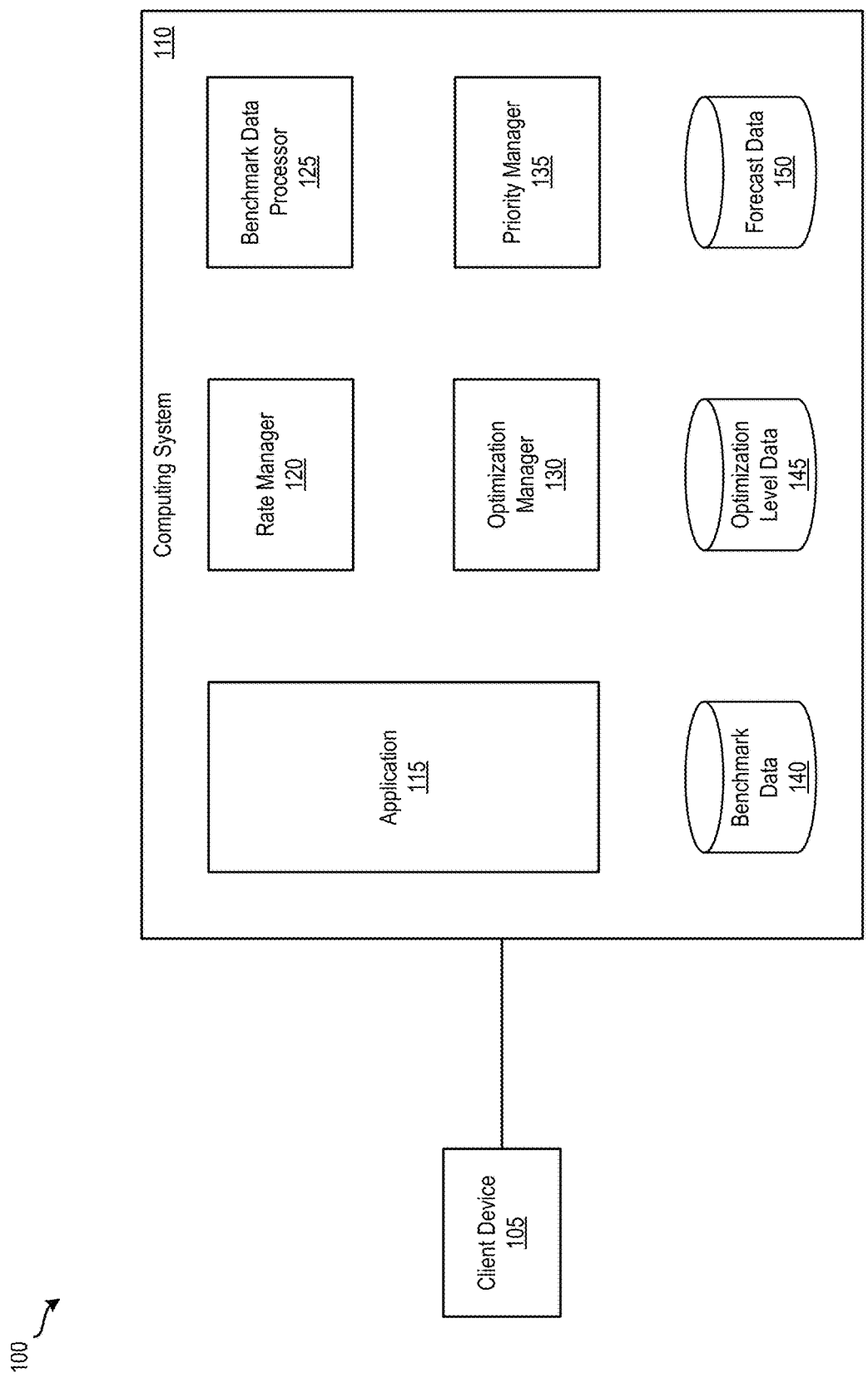
FIG. 1 illustrates a system for intelligently determining rate values based on historical data according to some embodiments.

FIG. 1 illustrates a system 100 for intelligently determining rate values based on historical data according to some embodiments. As shown, system 100 includes client device 105 and computing system 110. Client device 105 is configured to communicate and interact with computing system 110. For example, a user of client device 105 may send application 115 a request for rate information associated with a category of goods and/or services along with an aggressiveness value. In some embodiments, an aggressiveness value specifies a level of aggressiveness in determining the rate information. Rate information determined based on a higher aggressiveness value may be higher than rate information determined based on a lower aggressiveness value. However, the confidence and/or probability of achieving the rate information determined based on a higher aggressiveness value is lower than the confidence and/or probability of achieving the rate information determined based on a lower aggressiveness value. In response, client device 105 can receive the requested information from application 115. In some instances, a user of client device 105 sends application 115 a request for rate information associated with several categories of goods and/or services and aggressiveness values for each category of goods and/or services. In response to such a request, client device 105 may receive from application 115 rate information associated with the several categories of goods and/or services. In some embodiments, client device 105 receives rate information in the form of a graphical user interface (GUI) that includes the rate information.

In some instances, a user of client device 105 may receive a request from application 115 to answer a set of questions included in a questionnaire associated with a category of goods and/or services. In response to the request, the user of client device 105 sends application 115 a set of answers to the set of questions in the questionnaire. A questionnaire can include questions asking for a particular type of information associated with a category of goods and/or services in an industry. Examples of types of information include optimization level information (e.g., questions about recent activities effecting the optimization of expenditures of a category of goods and/or services), organizational difficulty information (e.g., questions about the level of difficulty for a company to implement a set of actions internally), market difficulty information (e.g., questions about the level of difficulty in the marketplace for a company to implement a set of actions supported by market conditions externally), etc. Although FIG. 1 shows one client device 105, one of ordinary skill in the art will appreciate that system 100 can include additional client devices that are similarly configured to client device 105 in some embodiments.

As illustrated in FIG. 1, computing system 110 includes application 115, rate manager 120, benchmark data processor 125, optimization manager 130, priority manager 135, and storages 140-150. Benchmark data storage 140 is configured to store benchmark data associated with different categories of goods and/services. In some embodiments, benchmark data associated with a particular category of goods and/or services includes an average savings rate value and a standard deviation value. In some embodiments, a good and/or service has a United Nations Standard Products and Services Code (UNSPSC) associated with it. In some such embodiments, a category for a good and/or service is determined based on the UNSPSC associated with the good and/or service. In some cases, benchmark data associated with a particular category of goods and/or services can also be associated with a particular industry. In some such cases, different sets of benchmark data may be associated with the same category of goods and/or services but associated with different industries. Benchmark data storage 140 may also store historical data associated with different goods and/or services and different industries. Examples of historical data include past transactions of goods and/or services. In some embodiments, a transaction can specify that a buyer purchased a set of items in a category of goods and/or services from a supplier for an agreed upon price.

Optimization level data storage 145 stores optimization level values for different categories of goods and/or services in different industries. In addition, optimization level data storage 145 may store different questionnaires that include questions asking for different types of information associated with a category of goods and/or services in an industry. Forecast data storage 150 is configured to store forecast values associated with different categories of goods and/or services. An example of a forecast value is a spend forecast value representing an estimated amount that will be spent for a category of goods and/or services in the future. In some embodiments, forecast values are generated by a component that operating on computing system 110 (e.g. application 115 or some other component included in computing system 110). In other embodiments, forecast values are generated by a component operating on a different computing system or device (not shown in FIG. 1).

In some embodiments, storages 140-150 are implemented in a single physical storage while, in other embodiments, storages 140-150 may be implemented across several physical storages. While FIG. 1 shows storages 140-150 as part of computing system 110, one of ordinary skill in the art will appreciate that benchmark data storage 140, optimization level data storage 145, and/or forecast data storage 150 may be external to computing system 110 in some embodiments.

Application 115 is a software application operating on computing system 110 that is responsible for providing client device 105 rate information for different categories of goods and/or services. For instance, application 115 may receive from client device 105 a request for savings information associated with a category of goods and/or services and an aggressiveness value. In response, application 115 sends rate manager 120 the request and the aggressiveness value for processing. Upon receiving the rate information from rate manager 120, application 115 forwards it to client device 105. In some instances, application 115 may receive from client device 105 a request for rate information associated with several categories of goods and/or services and aggressiveness values for each of the categories of goods and/or services. In response to the request, application 115 sends the request and the aggressiveness values to rate manager 120. Once application 115 receives the rate information associated with the several categories of goods and/or services from rate manager 120, application 115 forwards it to client device 105. In some cases, application 115 receives the requested rate information from priority manager 135 instead of rate manager 120. In some embodiments, application 115 provides the rate information to client device 105 in a GUI. Additionally, application 115 can send client device 105 a questionnaire (which application 115 retrieves from optimization level data storage 145) that includes a set of questions along with a request to provide answers to the set of questions in the questionnaire. When application 115 receives answer to the set of questions, application 115 sends them to either optimization manager 130 or priority manager 135. For example, if the question in the questionnaire are asking for optimization level information, application 115 sends the answers to the questions to optimization manager 130. Otherwise, application 115 sends them to priority manager 135.

Rate manager 120 is configured to determine rate information for different categories of goods and/or services. For example, rate manager 120 may receive from application 115 a request for rate information associated with a category of goods and/or services and an aggressiveness value. In response, rate manager 120 accesses forecast data storage 150 to retrieve a forecast value associated with the category of goods and/or services. Next, rate manager 120 accesses optimization level data storage 145 to retrieve an optimization level value associated with the category of goods and/or services. Rate manager 120 then accesses benchmark data storage 140 to retrieve an average benchmark savings rate value and a standard deviation value associated with the category of goods and/or services. Based on the optimized level value, the average benchmark savings rate value, the standard deviation value, and the aggressiveness value, rate manager 120 determines a savings rate value associated with a category of goods and/or services. In some embodiments, a savings rate value associated with a category of goods and/or services represents an estimated percentage that can be saved on future expenditures of the category of goods and/or services. In some cases, rate manager 120 determines a confidence value representing the likelihood of achieving the savings rate. In addition, rate manager 120 can determine a savings amount value based on the savings rate value and the forecast value. In some embodiments, a savings amount associated with a category of goods and/or services represents an estimated amount of savings on future expenditures for the category of goods and/or services. Rate manager 120 sends application 115 the determined savings rate value and the savings amount value (and the confidence value in some embodiments). In some instances, application 115 may receive from application 115 a request for rate information associated with several categories of goods and/or services and aggressiveness values for each of the several categories of goods and/or services. In response to such a request, application 115 performs the same operations mentioned above for each category of goods and/or services for which rate information is requested. In some embodiment, application 115 sends the rate information for the several categories of goods and/or services. In other embodiments, application 115 sends the rate information for the several categories of goods and/or services to priority manager 135 for further processing.

Benchmark data processor 125 handles the processing of benchmark data for different categories of goods and/or services in different industries. For instance, at defined intervals (e.g., once a day, once a week, once a month, etc.) benchmark data processor 125 determines benchmark data for each category of goods and/or services in each industry. For a particular category of goods and/or services in a particular industry, benchmark data processor 125 determines benchmark data by querying benchmark data storage 140 for past transactions associated with the category of goods and/or services and determining a savings rate value for each transaction.

In some cases, a past transaction includes a price paid by a buyer in the transaction for an item in a category of goods and/or services purchased from a supplier and a history of prices that the buyer paid for the same item in the past. In these cases, benchmark data processor 125 determines the savings rate value for such a transaction by calculating an average of the history of prices that the buyer paid in the past, calculating a difference between the price paid by the buyer in the transaction for the item and the average of the history of prices that the buyer paid in the past, and calculating a ratio (e.g., percentage) between the calculated difference and the price paid by the buyer in the transaction for the item.

In other cases, a past transaction includes a price paid by a buyer in the transaction for an item in a category of goods and/or services purchased from a supplier, a highest bidder price in the transaction, and a lowest bidder price in the transaction. In these other cases, benchmark data processor 125 determines the savings rate value for the transaction by calculating an average price between the highest bidder price and the lowest bidder price, calculating a difference between the price paid by the buyer in the transaction for the item and the average, and calculating a ratio (e.g., percentage) between the calculated difference and the price paid by the buyer in the transaction for the item.

In some other cases, a past transaction includes a highest bidder price in the transaction, a lowest bidder price in the transaction, and a history of prices that a buyer paid for an item in a category of goods and/or services in the past. For these cases, benchmark data processor 125 determines the savings rate value for the transaction by calculating an average price between the highest bidder price and the lowest bidder price, calculating an average of the history of prices that the buyer paid in the past, calculating a difference between the average price between the highest bidder price and the lowest bidder price and the average of the history of prices that the buyer paid in the past, and calculating a ratio (e.g., percentage) between the calculated difference and the average price between the highest bidder price and the lowest bidder price.

After benchmark data processor 125 determines determining savings rate values for the past transactions, benchmark data processor 125 calculates an average of the savings rate values based on the determined savings rate values. Next, benchmark data processor 125 calculates a standard deviation of the savings rate values determined for the past transactions associated with the category of goods and/or services. Benchmark data processor 125 then stores the average of the savings rate values and the standard deviation of the savings rate values in benchmark data storage 140. Benchmark data processor 125 performs the operations described above for each category of goods and/or services in each industry.

Optimization manager 130 is configured to manage optimization level data. For example, optimization manager 130 can receive a set of answers to a set of questions included in a questionnaire (e.g., a questionnaire that includes questions asking for optimization level information) associated with a category of goods and/or services in an industry. Based on the answers to the questionnaire, optimization manager 130 determines an optimization level value associated with the category of goods and/or services in the industry. In some embodiments, optimization manager 130 determines an optimization level value by mapping the set of answers to a set of numerical values (e.g., integers, real numbers, etc.) and calculating an average of the set of numerical values. In some such embodiments, different weights can be assigned to different questions in the questionnaire. In these embodiments, optimization manager 130 calculates the average of the set of numerical values by calculating a weighted average of the set of numerical values using the corresponding weights associated with the set of answers.

Priority manager 135 is responsible for prioritizing groups of different categories of goods and/or services based on their associated rate information. For instance, priority manager 135 may receive from application 115 rate information (e.g., a savings rate value and a savings amount value) for several categories of goods and/or services. In response to receiving the data, priority manager 135 determines a prioritized list of the categories of goods and/or services. In some embodiments, priority manager 135 prioritizes the categories of goods and/or services based on the rate information associated with the categories of goods and/or services, organizational difficulty values associated with the categories of goods and/or services, market difficulty values associated with the categories of goods and/or services, and a Pugh matrix. Priority manager 135 sends application 115 the list of prioritized categories of goods and/or services and the rate information associated with the categories of goods and/or services.

Additionally, priority manager 135 is responsible for managing organizational difficulty values and market difficulty values associated with different categories of goods and/or services in different industries. For example, priority manager 135 can receive from application 115 a set of answers to a set of answers to a set of questions included in a questionnaire (e.g., a questionnaire that includes questions asking for organizational difficulty information, a questionnaire that includes questions asking for market difficulty information, etc.) associated with a category of goods and/or services in an industry. For answers to a questionnaire asking for organizational difficulty information, priority manager 135 determines, based on the answers to the questionnaire, an organizational difficulty value (also referred to as an organizational difficulty score) associated with the category of goods and/or services in the industry. In some embodiments, priority manager 135 determines an organizational difficulty level value by mapping the set of answers to a set of numerical values (e.g., integers, real numbers, etc.) and calculating an average of the set of numerical values. In some such embodiments, different weights can be assigned to different questions in the questionnaire. In these embodiments, priority manager 135 calculates the average of the set of numerical values by calculating a weighted average of the set of numerical values using the corresponding weights associated with the set of answers. For answers to a questionnaire asking for market difficulty information, priority manager 135 determines, based on the answers to the questionnaire, a market difficulty value (also referred to as a market difficulty score) associated with the category of goods and/or services in the industry. In some embodiments, priority manager 135 determines a market difficulty level value by mapping the set of answers to a set of numerical values (e.g., integers, real numbers, etc.) and calculating an average of the set of numerical values. In some such embodiments, different weights can be assigned to different questions in the questionnaire. In these embodiments, priority manager 135 calculates the average of the set of numerical values by calculating a weighted average of the set of numerical values using the corresponding weights associated with the set of answers.

FIG. 2 illustrates an example questionnaire 200 according to some embodiments. In particular, questionnaire 200 is an example of a questionnaire that application 115 can provide to client device 105 to request for information (e.g., optimization level information, organizational difficulty information, market difficulty information, etc.). As depicted, questionnaire 200 includes questions #1-N and selectable user interface (UI) element (e.g., UI button) 240. Question #1 includes user interface (UI) control (e.g., a radio button control) 205. UI control 205 includes five selectable UI elements 210-235. UI control 205 is configured to allow only one of the UI elements 210-235 to be selected. That is, when a first UI element in UI elements 210-235 is selected and then a second UI element in UI elements 210-235 is selected, the first UI element becomes unselected. Questions #2-N also include a UI control similarly configured to UI control 205 in this example. UI element 240 is configured to, when selected by a user of client device 105, cause client device 105 to send selections of UI controls for questions #1-N (e.g., answers to questions #1-N) to application 115. As explained above, application 115 may send the answers to the questionnaire to optimization manager 130 or priority manager 135 depending on the type of information the questions in the questionnaire is asking for (e.g., application 115 sends answers to questionnaires that include questions asking for optimization level information to optimization manager 130 and sends answers to questionnaires that include questions asking for any other type of information (e.g., organizational difficulty information, market difficulty information, etc.) to priority manager 135). As described above, optimization manager 130 and priority manager 135 each processes answers to a questionnaire using similar techniques. Referring to questionnaire 200 as an example, an "Extremely Low" answer to a question can be mapped to the value 1, a "Somewhat Low" answer to a question can be mapped to the value 2, a "Neutral" answer to a question can be mapped to the value 3, a "Somewhat High" answer to a question can be mapped to the value 4, and a "Extremely High" answer to a question can be mapped to the value 5. Based on the answers to questions #1-N, optimization manager 130/priority manager 135 maps each answer in the set of answers to a numerical value (a number between 1-5 in this example) and calculates an average of the set of numerical values. In some embodiments, each of the questions #1-N may be assigned the same or different weight values. In some such embodiments, optimization manager 130/priority manager 135 calculates a weighted average of the set of numerical values based on the assigned weights to each of the questions #1-N.

Figure 3:
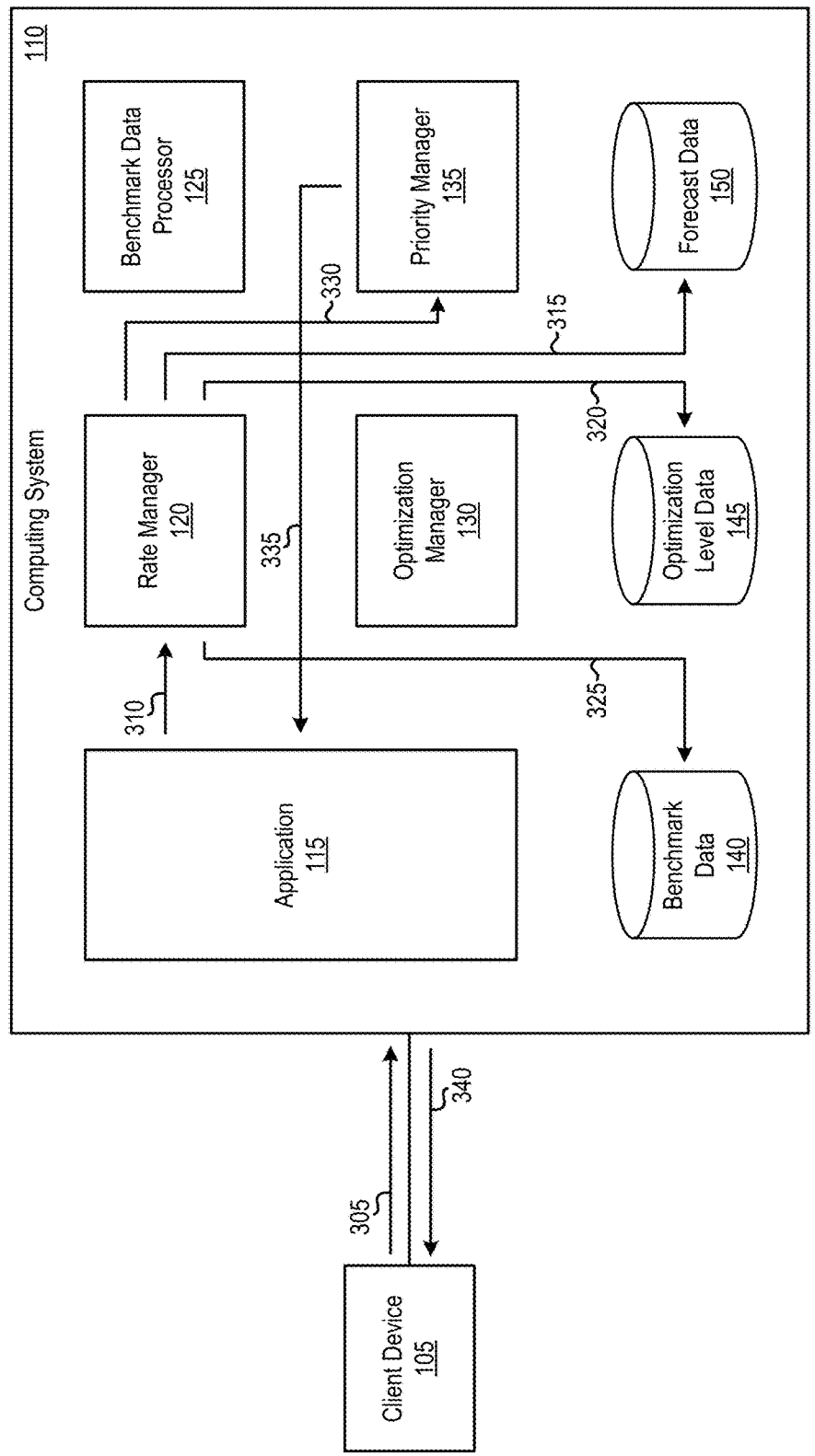
FIG. 3 illustrates an example operation of the system illustrated in FIG. 1 according to some embodiments.

FIG. 3 illustrates an example operation of system 100 according to some embodiments. Specifically, the example operation demonstrates how rate information is intelligently determined for a category of goods and/or services in an industry. For this example, benchmark data processor 125 has determined benchmark data for each category of goods and/or services in an industry for which there is a history of transactions. That is, benchmark data processor 125 has calculated an average of savings rate values and a standard deviation of the savings rate values for each of these categories of goods and/or services and stored these values in benchmark data storage 140.

The example operation starts by a user of client device 105 sending, at 305, application 115 a request for rate information associated with several categories of goods and/or services in an industry and aggressiveness values for each category of goods and/or services. Upon receiving the request and the aggressiveness values, application 115 forwards, at 310, them to rate manager 120. When rate manager 120 receives the request and the aggressiveness values, rate manager 120 accesses, at 315, forecast data storage to retrieve a spend forecast value for each of the requested categories of goods and/or services. Next, rate manager 120 accesses, at 320, optimization level data storage 145 to retrieve an optimization level value for each of the requested categories of goods and/or services. Rate manager 120 then accesses, at 325, benchmark data storage 140 to retrieve an average benchmark savings rate value and a standard deviation value associated with each of the requested categories of goods and/or services. For each category of goods and/or services, rate manager 120 determines a savings rate value based on the average benchmark savings rate value associated with the category of goods and/or services, the standard deviation value associated with the category of goods and/or services, the optimization level value associated with the category of goods and/or services, and the aggressiveness value associated with the category of goods and/or services. In some embodiments, rate manager 120 uses the following equation (1) to calculate the savings rate value associated with a category of goods and/or services:

$$\text{Savings rate} = m + (x \times StdDev) - \left(\frac{y}{c1} \times m\right)$$

where m is the average benchmark savings rate value associated with the category of goods and/or services, x is the value calculated based on an aggressiveness value associated with the category of goods and/or services, StdDev is the standard deviation value associated with the category of goods and/or services, y is the optimization level value associated with the category of goods and/or services, and c1 is a defined constant value (e.g., 4, 5, 6, etc.). Rate manager 120 can use the following equation (2) to calculate x:

$$x = \frac{(AggVal - c2)}{c3}$$

where AggVal is the aggressiveness value associated with the category of goods and/or services, c2 is a first defined constant value (e.g., 2.5, 2.6, 2.7, etc.), and c3 is a second defined constant value (e.g., 1.38, 1.4, 1.6, 2.0, 2.5, etc.). In some embodiments, rate manager 120 may use machine learning to predict values for x and y. For instance, rate manager 120 can use a convolutional neural network (CNN) to predict values for x and y. As shown in equation (1), the aggressiveness value associated with the category of goods and/or services is used to increase the average benchmark savings rate value associated with the category of goods and/or services. The higher the aggressiveness value, the more the average benchmark savings rate value is increased, but the lower the confidence value and/or probability of achieving the estimated savings. On the other hand, the optimization level value associated with the category of goods and/or services is used to decrease the average benchmark savings rate value associated with the category of goods and/or services. The higher the optimization level value, the more the average benchmark savings rate value is decreased.

Equation (1) is one example of a function that rate manager 120 may use to determine a savings rate. It can be described functionally as a set of adjustments to an average benchmark savings rate based on a set of criteria. The criteria employed in equation (1) are the spread of the savings rate values used to determine the average benchmark savings rate and optimization level. In some embodiments, the average benchmark savings rate can be adjusted based on additional and/or different criteria. For instance, the average benchmark savings rate can be adjusted based on a commodity index.

After calculating a savings rate value for a category of goods and/or services, rate manager 120 may calculate a savings amount by multiplying the calculated savings rate value by the spend forecast value associated with the category of goods and/or services. Once rate manager 120 calculates a savings rate and a savings amount for each of the requested categories of goods and/or services, rate manager 120 sends, at 330, these values to priority manager 135. Upon receiving the data from rate manager 120, priority manager 135 determines a prioritized list of the categories of goods and/or services. In this example, priority manager 135 uses a Pugh matrix to prioritize the categories of goods and/or services based on the savings rate values associated with the categories of goods and/or services, the savings amounts associated with the categories of goods and/or services, the organizational difficulty values associated with the categories of goods and/or services, the market difficulty values associated with the categories of goods and/or services. After priority manager 135 determines the prioritized list of categories of goods and/or services, priority manager 135 sends, at 335, the list to application 115. For this example, application 115 includes the prioritized categories of goods and/or services and their corresponding savings rates and savings amounts in a GUI and provides the GUI to client device 105.

Figure 4:
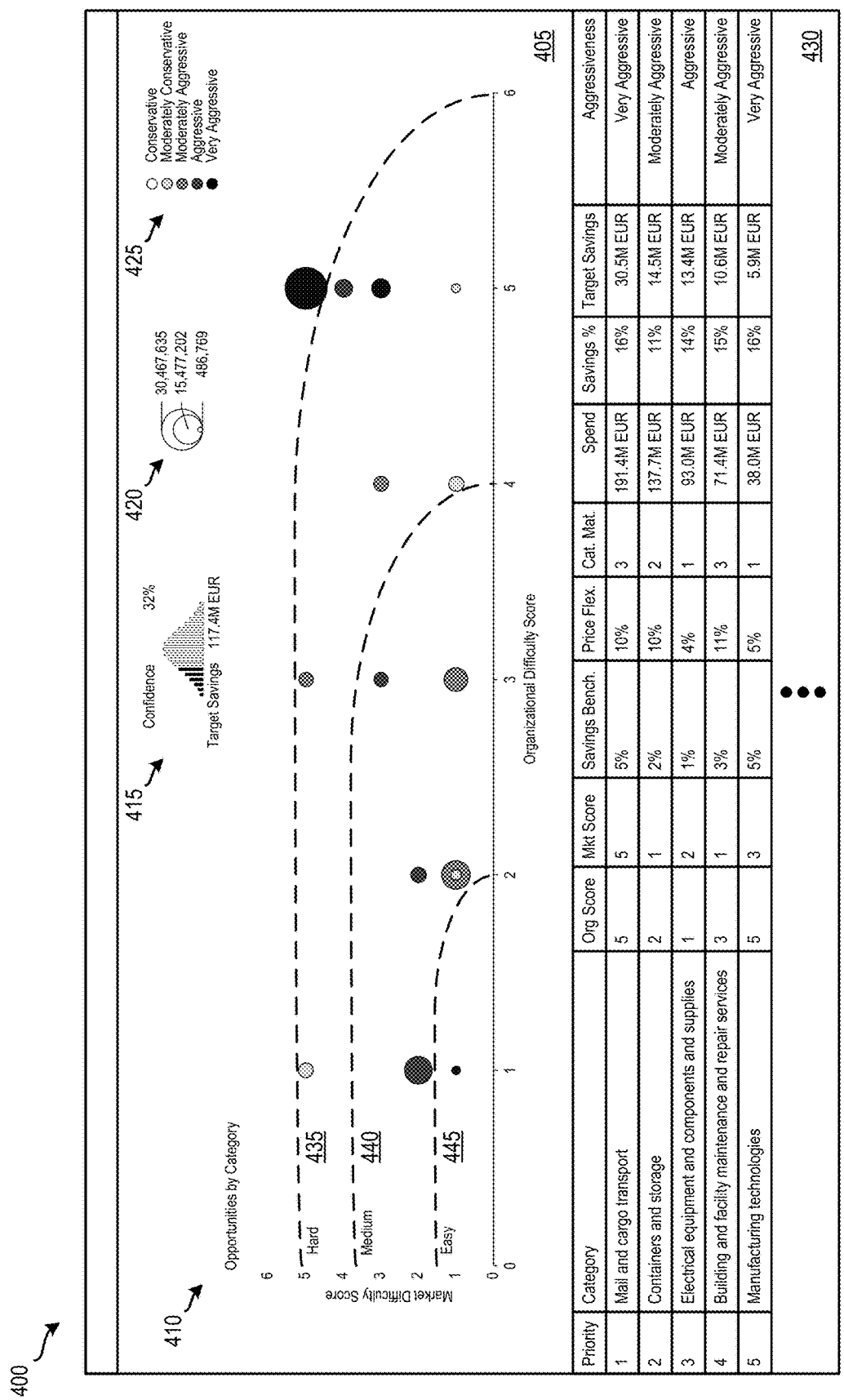
FIG. 4 illustrates an example graphical user interface (GUI) for providing rate data for different categories according to some embodiments.

FIG. 4 illustrates an example GUI 400 for providing rate data for different categories according to some embodiments. In particular, application 125 provides GUI 400 to client device 105 for this example operation. As shown, GUI 400 includes visualization 405 and table 430. Visualization 405 includes chart 410, overview information 415, bubble information 420, and aggressiveness information 425. Chart 410 includes an x-axis and a y-axis. The x-axis of chart 410 specifies organizational difficulty scores and the y-axis of chart 410 specifies market difficulty scores. Chart 410 also includes several bubbles representing the different categories of goods and/or services shown in table 430. Each bubble has a particular size (e.g., circumference, area, etc.) and is filled with a particular color. Each bubble is placed in chart 410 based on the organizational difficulty score and the market difficulty score associated with the category of goods and/or service that the bubble represents. Overview information 415 provides graphic showing the proportion of the cumulative amount of savings amount of the categories of goods and/or services listed in table 430 with respect to the cumulative amount of spend forecast values associated with the categories of goods and/or services listed in table 430. In addition, overview information 415 includes a confidence level (32% in this example) that represents the average confidence level of the estimated savings rates associated with the categories of goods and/or services listed in table 430. In some embodiments, a confidence level of an estimated savings rate associated with a particular category of goods and/or services is determined based on a z table and the x value described above in equations (1) and (2). In other embodiments, a confidence level of an estimated savings rate associated with a particular category of goods and/or services is determined using a cumulative distribution function (CFD) of a standard normal distribution and the x value described above in equations (1) and (2). Bubble information 420 provides information about different savings amounts represented by different sizes of bubbles shown in chart 410. Aggressiveness information 425 provides information about different aggressiveness levels represented by different colors of bubbles in shown in chart 410. Additionally, chart 410 includes three areas 435-445 separated by dotted lines. Area 445 includes bubbles representing categories of goods and/or services with savings rates that are easy to implement based on the organizational difficulty score and the market difficulty score associated with the category of goods and/or services. Area 440 includes bubbles representing categories of goods and/or services with savings rates that have a medium difficulty to implement based on the organizational difficulty score and the market difficulty score associated with the category of goods and/or services. Lastly, area 435 includes bubbles representing categories of goods and/or services with savings rates that are hard to implement based on the organizational difficulty score and the market difficulty score associated with the category of goods and/or services.

Table 430 includes records of data for each of the requested categories of goods and/or services in the example operation. As depicted, table 430 includes eleven columns.

The first column stores a priority value. Here, records of data in table 430 have been prioritized (e.g., by priority manager 135) in the manner described above. As shown, the first record in table 430 is associated with a mail and cargo transport category of goods and/or services and has the highest priority, the second record in table 430 is associated with a containers and storage category of goods and/or services and has the second highest priority, the third record in table 430 is associated with an electrical equipment and components and supplies category of goods and/or services and has the third highest priority, etc. The second column stores a name of a category of goods and/or services. The third column stores an organizational difficulty score and the fourth column stores a market difficulty score. The fifth column stores an average savings rate while the sixth column stores a standard deviation value. The seventh column (the category maturity column) stores an optimization level value. The eighth column stores a spend forecast value. The ninth column stores an estimated savings rate and the tenth column stores an estimated savings amount. Finally, the eleventh column stores an aggressiveness value. As shown in table 430, the user of client device 105 has specified different aggressiveness value for different categories of goods and/or services. For example, the user of client device 105 has specified a "Very Aggressive" value for the first and fifth categories, a "Moderately Aggressive" value for the second and fourth categories, and an "Aggressive" value for the third category.

In some embodiments, application 125 can provide a drill-down feature in GUI 400 for exploring different categories of goods and/or services. For example, in some such embodiments, a user may select a bubble representing a category of goods and/or services in chart 410. In response, application 115 provides an option (e.g., via a pop-up window) for drilling down into the category of goods and/or services represented. Upon selection of the option, application 115 provides a chart and table similar to chart 410 and table 430 except the data in chart 410 and table 430 are for subcategories of goods and/or services of the selected category of goods and/or services. The user may continue drilling down to explore subcategories of these subcategories.

Figure 5:
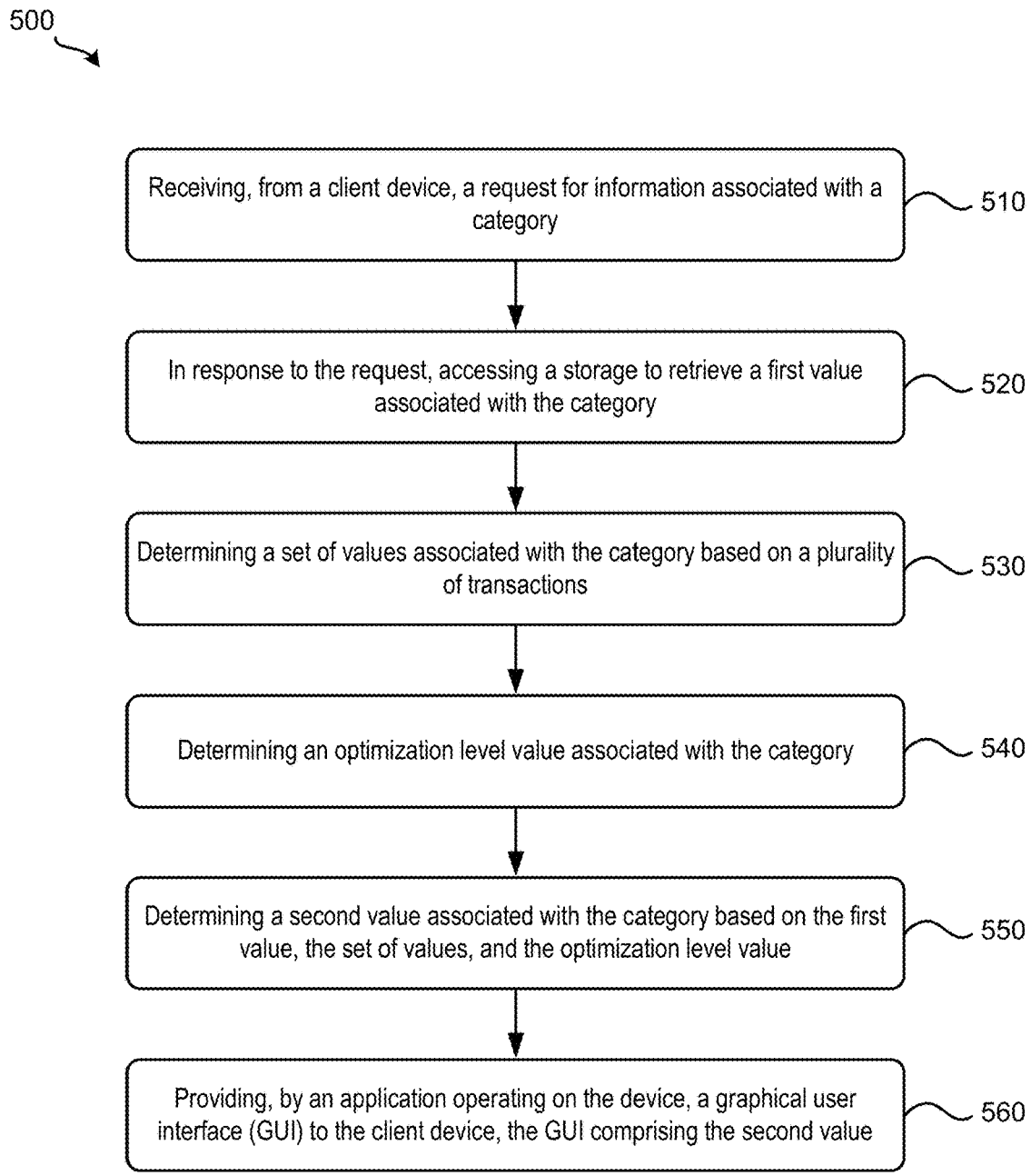
FIG. 5 illustrates a process for intelligently determining a rate value according to some embodiments.

FIG. 5 illustrates a process 500 for intelligently determining a rate value according to some embodiments. In some embodiments, computing system 110 performs process 500. Process 500 begins by receiving, at 510, from a client device, a request for information associated with a category. Referring to FIG. 3 as an example, application 115 may receive the request for information associated with a category of goods and/or services from client device 105. Next, in response to the request, process 500 accesses, at 520, a storage to retrieve a first value associated with the category. Referring to FIG. 3 as an example, rate manager 120 can access forecast data storage 150 to retrieve a forecast value associated with the category of goods and/or services.

Process 500 then determines, at 530, a set of values associated with the category based on a plurality of transactions. Referring to FIG. 2 as an example, rate manager 120 determines an average rate value by accessing benchmark data storage 140 and retrieving the average rate value associated with the category of goods and/or services. Also, rate manager 120 determines a standard deviation value by accessing benchmark data storage 140 and retrieving the standard deviation value associated with the category of goods and/or services.

At 540, process 500 determines an optimization level value associated with the category. Referring to FIG. 2 as an example, rate manager 120 determines the optimization level value by accessing optimization level data storage 145 and retrieving the optimization level value associated with the category of goods and/or services. Next, process 500 determines, at 550, a second value associated with the category based on the first value, the set of values, and the optimization level value. Referring to FIG. 2 as an example, rate manager 120 determines a rate value using equations (1) and (2) provided above. Rate manager 120 may determine a savings amount by multiplying the rate value by forecast value. Finally, at 560, process 500 provides, by an application operating on the device, a graphical user interface (GUI) to the client device, the GUI comprising the second value. Referring to FIG. 3 as an example, application 115 may provide GUI 400, which includes the requested rate value, to client device 105.

Figure 6:
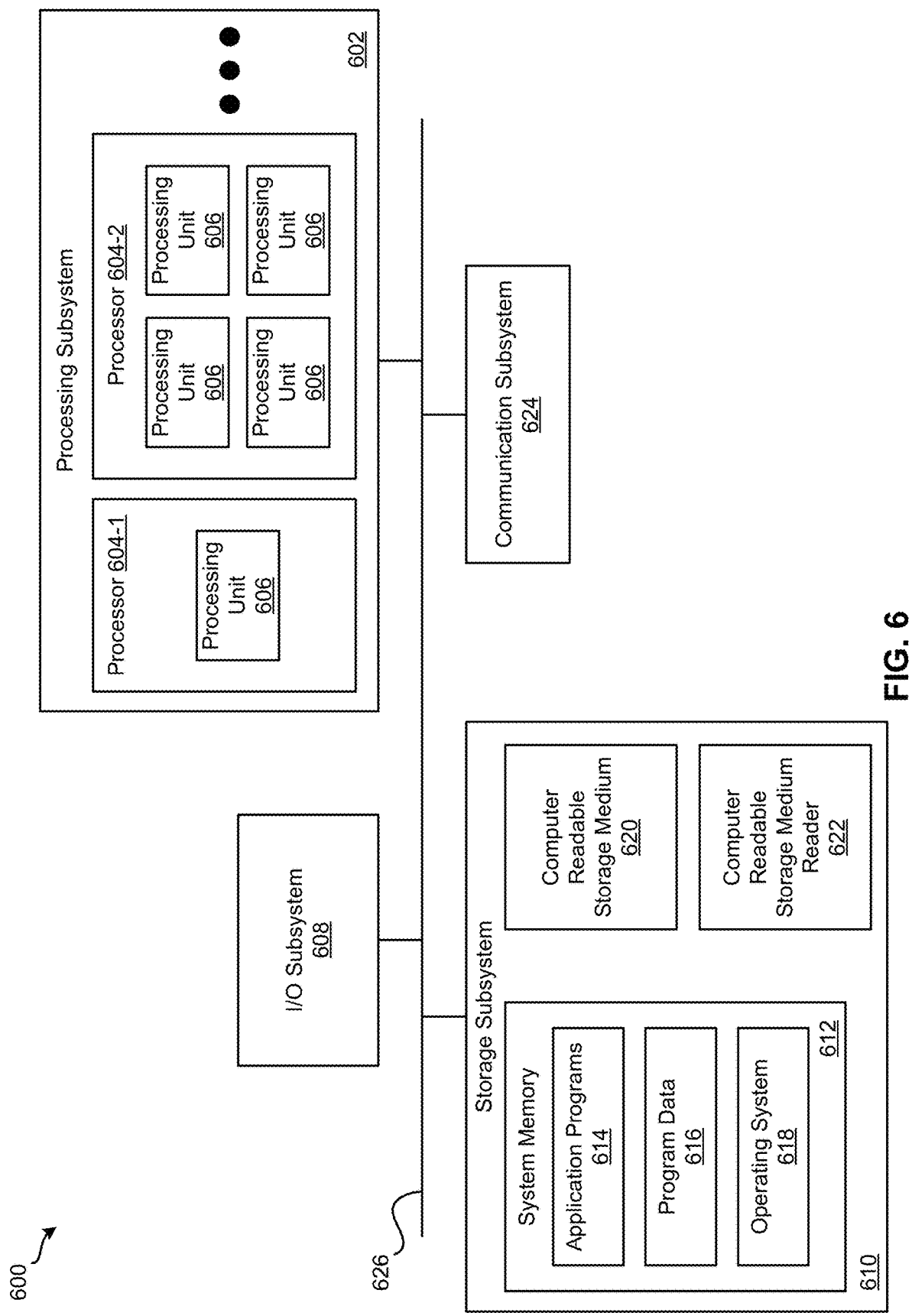
FIG. 6 illustrates an exemplary computer system, in which various embodiments may be implemented.

FIG. 6 illustrates an exemplary computer system 600 for implementing various embodiments described above. For example, computer system 600 may be used to implement client device 105 and computing system 110. Computer system 600 may be a desktop computer, a laptop, a server computer, or any other type of computer system or combination thereof. Some or all elements of application 115, rate manager 120, benchmark data processor 125, optimization manager 130, priority manager 135, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 115), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., application 115, rate manager 120, benchmark data processor 125, optimization manager 130, and priority manager 135) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
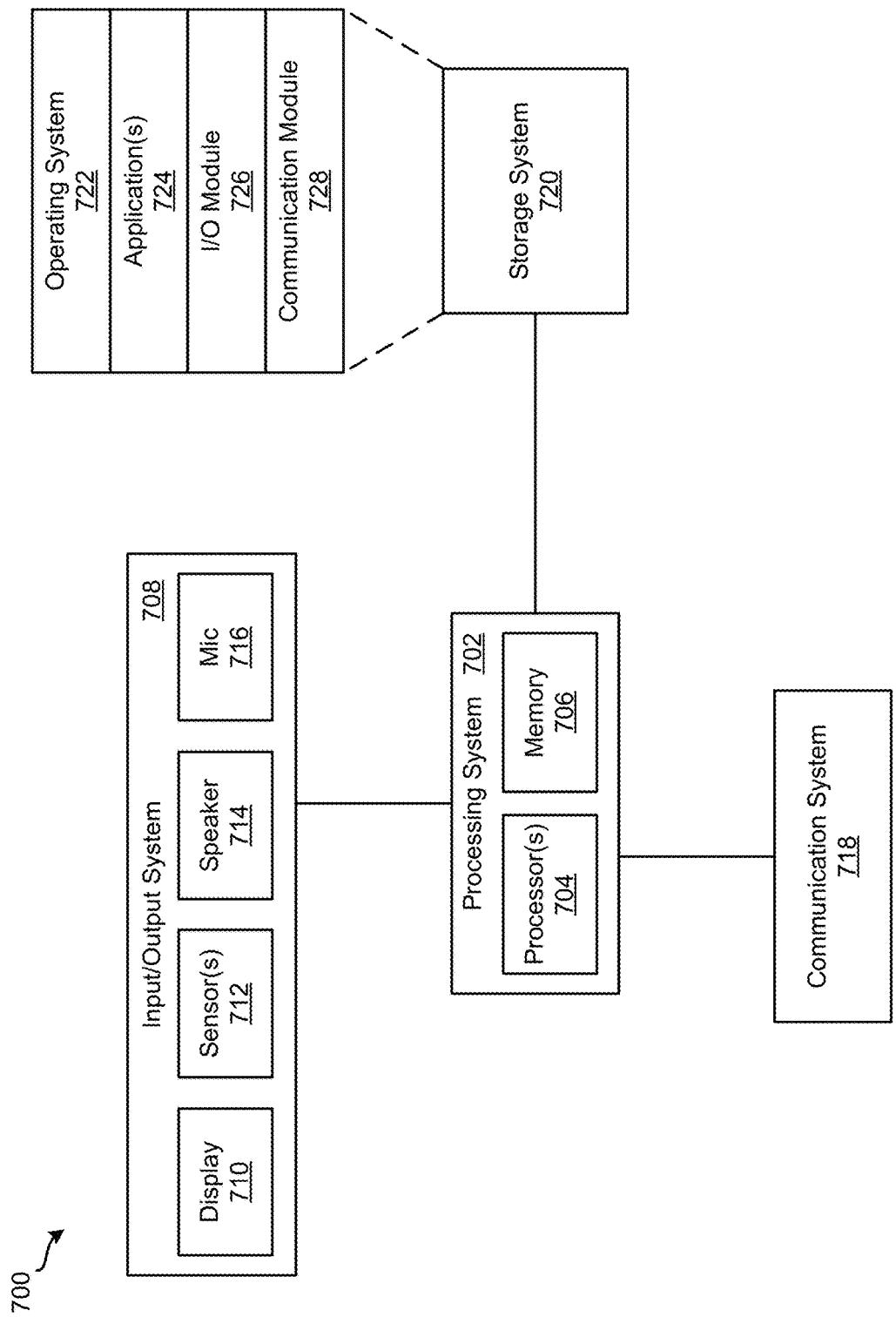
FIG. 7 illustrates an exemplary computing device, in which various embodiments may be implemented.

FIG. 7 illustrates an exemplary computing device 700 for implementing various embodiments described above. For example, computing device 700 may be used to implement client device 105. Computing device 700 may be a cellphone, a smartphone, a wearable device, an activity tracker or manager, a tablet, a personal digital assistant (PDA), a media player, or any other type of mobile computing device or combination thereof. As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
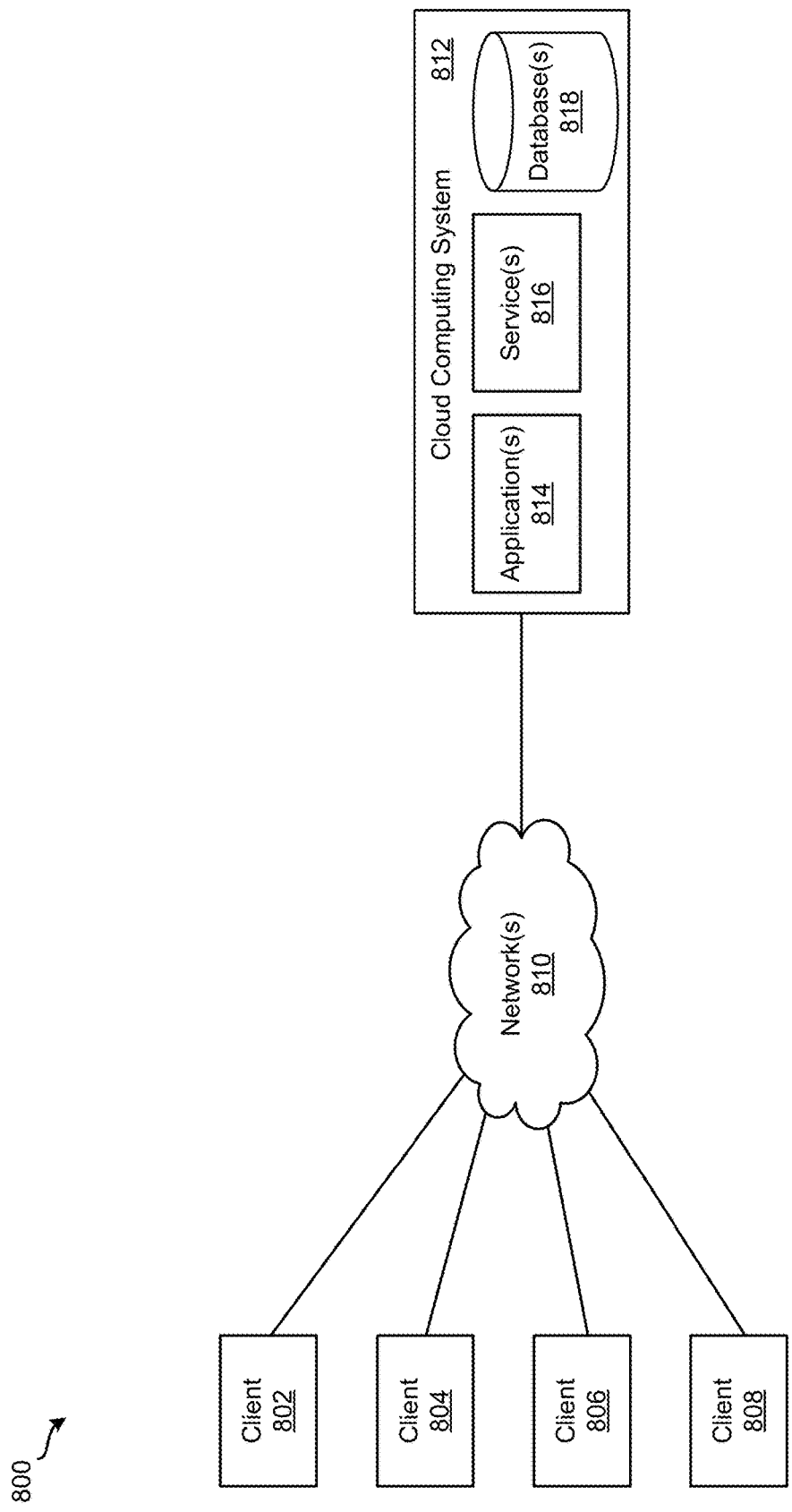
FIG. 8 illustrates an exemplary system, in which various embodiments may be implemented.

FIG. 8 illustrates an exemplary system 800 for implementing various embodiments described above. For example, any of the client devices 802-808 may be used to implement client device 105 and cloud computing system 812 may be used to implement computing system 110. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 812 is referred to as a "cloud service." Typically, servers and systems that make up cloud computing system 812 are different from the on-premises servers and systems of a customer. For example, cloud computing system 812 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 140-150 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

receiving a plurality of data associated with a plurality of categories;

providing a first portion of the plurality of data associated with the plurality of categories to an optimization manager operating on the device;

providing a second portion of the plurality of data associated with the plurality of categories to a priority manager operating on the device;
determining, by the optimization manager, a plurality of optimization level values associated with the plurality of categories based on the first portion of the plurality of data associated with the plurality of categories;
receiving, from a client device, a request for information associated with the plurality of categories;
determining a plurality of values associated with the plurality of categories based on the plurality of optimization level values;
prioritizing, by the priority manager, the plurality of categories based on the second portion of the plurality of data associated with the plurality of categories; and
providing, by an application operating on the device, a graphical user interface (GUI) to the client device, the GUI comprising the plurality of values organized based on the prioritized plurality of categories.

2. The non-transitory machine-readable medium of claim 1, wherein determining the plurality of values associated with the plurality of categories is further based on a plurality of forecast values.

3. The non-transitory machine-readable medium of claim 2, wherein each forecast value in the plurality of forecast value is determined based on a set of historical expenditure values.

4. The non-transitory machine-readable medium of claim 2, wherein each forecast value in the plurality of forecast values represents an estimated amount to spend on goods or services in the future for a category in the plurality of categories.

5. The non-transitory machine-readable medium of claim 1, wherein the plurality of values is a first plurality of values, wherein the program further comprises a set of instructions for determining a second plurality of values associated with the plurality of categories based on a plurality of transactions.

6. The non-transitory machine-readable medium of claim 5, wherein each transaction in the plurality of transactions comprises a price paid by a buyer in the transaction for an item in a category of goods and/or services purchased from a supplier and a history of prices that the buyer paid for the same item in the past.

7. The non-transitory machine-readable medium of claim 5, wherein each transaction in the plurality of transaction comprises a price paid by a buyer in the transaction for an item in a category of goods and/or services purchased from a supplier, a highest bidder price in the transaction, and a lowest bidder price in the transaction.

8. A method executable by a device, the method comprising:
receiving a plurality of data associated with a plurality of categories;
providing a first portion of the plurality of data associated with the plurality of categories to an optimization manager operating on the device;
providing a second portion of the plurality of data associated with the plurality of categories to a priority manager operating on the device;
determining, by the optimization manager, a plurality of optimization level values associated with the plurality of categories based on the first portion of the plurality of data associated with the plurality of categories;
receiving, from a client device, a request for information associated with the plurality of categories;
determining a plurality of values associated with the plurality of categories based on the plurality of optimization level values;
prioritizing, by the priority manager, the plurality of categories based on the second portion of the plurality of data associated with the plurality of categories; and
providing, by an application operating on the device, a graphical user interface (GUI) to the client device, the GUI comprising the plurality of values organized based on the prioritized plurality of categories.

9. The method of claim 8, wherein determining the plurality of values associated with the plurality of categories is further based on a plurality of forecast values.

10. The method of claim 9, wherein each forecast value in the plurality of forecast value is determined based on a set of historical expenditure values.

11. The method of claim 9, wherein each forecast value in the plurality of forecast values represents an estimated amount to spend on goods or services in the future for a category in the plurality of categories.

12. The method of claim 8, wherein the plurality of values is a first plurality of values, the method further comprising determining a second plurality of values associated with the plurality of categories based on a plurality of transactions.

13. The method of claim 12, wherein each transaction in the plurality of transactions comprises a price paid by a buyer in the transaction for an item in a category of goods and/or services purchased from a supplier and a history of prices that the buyer paid for the same item in the past.

14. The method of claim 12, wherein each transaction in the plurality of transaction comprises a price paid by a buyer in the transaction for an item in a category of goods and/or services purchased from a supplier, a highest bidder price in the transaction, and a lowest bidder price in the transaction.

15. A system comprising:
a set of processing units; and
a non-transitory machine-readable medium storing instructions that when executed by at least one processing unit in the set of processing units cause the at least one processing unit to:
receive a plurality of data associated with a plurality of categories;
provide a first portion of the plurality of data associated with the plurality of categories to an optimization manager operating on the system;
provide a second portion of the plurality of data associated with the plurality of categories to a priority manager operating on the system;
determine, by the optimization manager, a plurality of optimization level values associated with the plurality of categories based on the first portion of the plurality of data associated with the plurality of categories;
receive, from a client device, a request for information associated with the plurality of categories;
determine a plurality of values associated with the plurality of categories based on the plurality of optimization level values;
prioritize, by the priority manager, the plurality of categories based on the second portion of the plurality of data associated with the plurality of categories; and
provide, by an application operating on the system, a graphical user interface (GUI) to the client device, the GUI comprising the plurality of values organized based on the prioritized plurality of categories.

16. The system of claim 15, wherein determining the plurality of values associated with the plurality of categories is further based on a plurality of forecast values.

17. The system of claim 16, wherein each forecast value in the plurality of forecast value is determined based on a set of historical expenditure values.

18. The system of claim 16, wherein each forecast value in the plurality of forecast values represents an estimated amount to spend on goods or services in the future for a category in the plurality of categories.

19. The system of claim 15, wherein the plurality of values is a first plurality of values, wherein the instructions further cause the at least one processing unit to determine a second plurality of values associated with the plurality of categories based on a plurality of transactions.

20. The system of claim 19, wherein each transaction in the plurality of transactions comprises a price paid by a buyer in the transaction for an item in a category of goods and/or services purchased from a supplier and a history of prices that the buyer paid for the same item in the past.

\* \* \* \* \*